Sept. 17, 1963

B. BORISOF 3,103,689

ROLLER APPLICATORS

Filed Aug. 1, 1960

INVENTOR.
Bernard Borisof
BY Ooms, McDougall
Williams & Hersh
Attorneys

Sept. 17, 1963  B. BORISOF  3,103,689
ROLLER APPLICATORS
Filed Aug. 1, 1960  3 Sheets-Sheet 2
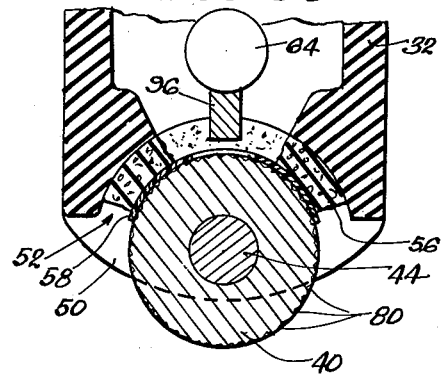
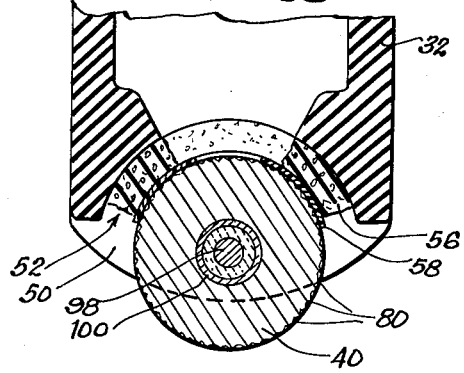
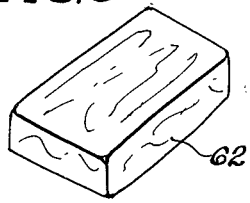
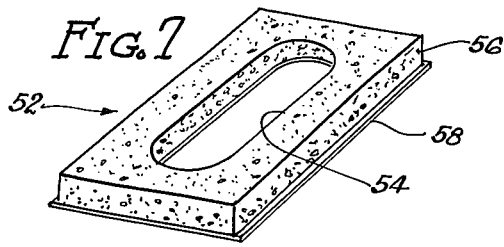
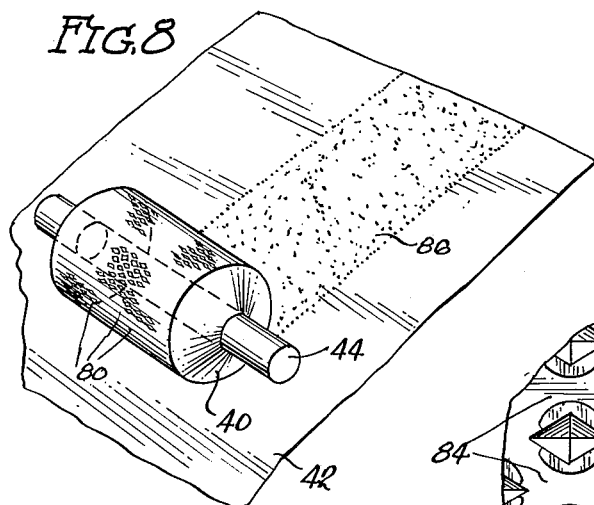
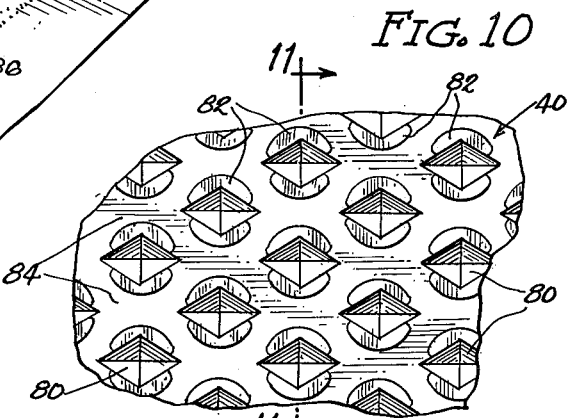
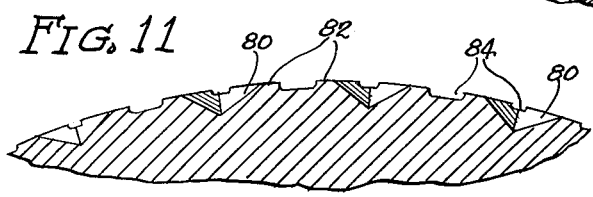
INVENTOR.
Bernard Borisof
BY Jones, McDougall,
Williams & Hersh
Attorneys Sept. 17, 1963 B. BORISOF 3,103,689
ROLLER APPLICATORS
Filed Aug. 1, 1960 3 Sheets-Sheet 3
*FIG. 14*
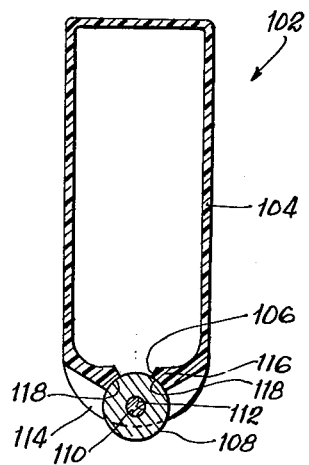
*FIG. 15*
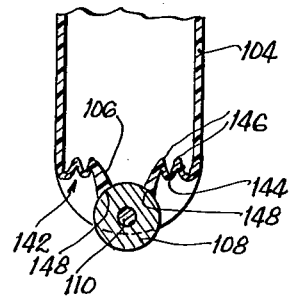
*FIG. 17* *FIG. 16*
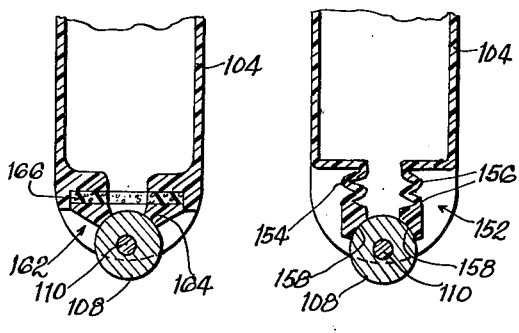
*FIG. 18*
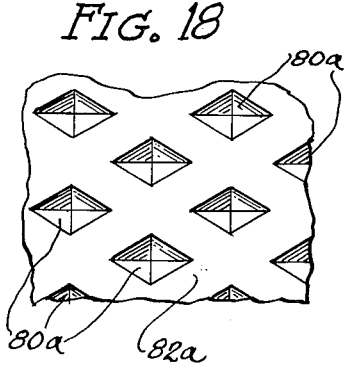
*FIG. 19*
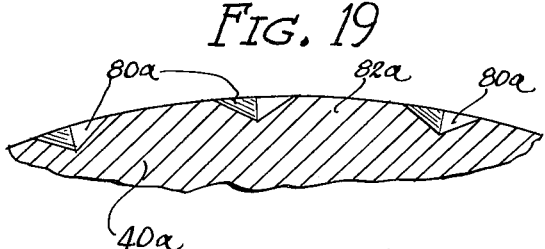
INVENTOR.
Bernard Borisof
BY Ooms, McDougall,
Williams & Hersh
Attorneys

United States Patent Office 3,103,689
Patented Sept. 17, 1963

3,103,689
ROLLER APPLICATORS
Bernard Borisof, 4151 Montrose Ave., Chicago, Ill.
Filed Aug. 1, 1960, Ser. No. 46,520
12 Claims. (Cl. 15—504)

This invention relates to new and improved roller applicators for applying liquid and fluid materials, such as adhesives, ink, solvents, pastes, slurries, powders, granular materials and the like.

One object of the invention is to provide new and improved roller applicators which are particularly well adapted for applying adhesives or other fluid materials to paper or the like.

One object of the present invention is to provide a new and improved roller applicator which is adapted to apply an adhesive or the like that is normally solid, at ordinary temperatures, but is maintained and applied in a liquid state by the applicator. Thus, it is a further object of the present invention to provide a new and improved roller applicator having means for heating the adhesive so as to maintain it in a liquid condition.

Another object of the invention is to provide a new and improved roller applicator having a trough or other receptacle adapted to hold a supply of the adhesive or other fluid, together with a roller mounted so as to close an orifice at the bottom of the trough. In this way, the roller is supplied continuously with the fluid, and is adapted to apply the fluid to a piece of paper or the like, when rolled over the surface of the paper.

A further object is to provide a new and improved roller applicator of the foregoing character, having means for preventing leakage of the adhesive or other fluid between the roller and the trough.

Another object is to provide a new and improved roller applicator of the foregoing character, in which the roller is provided with a large number of small pits or depressions, distributed over the entire surface of the roller, so that the roller will be capable of applying a rough coat of adhesive or other fluid, while forming a leakproof seal across the orifice in the trough. The outer surface of the roller may have an appearance which resembles knurling, but the surface of the roller is formed with pits rather than knobs, as in conventional knurling. Thus, the outer surface of the roller is smooth between the pits, so that a leakproof seal may be formed between the roller and the trough.

A further object is to form the roller with shallow grooves or interstices affording communication between the pits, so that the adhesive or other fluid will be spread between the pits.

Another object is to form a new and improved roller applicator having a receptacle or fountain in the form of a closed flexible squeeze bottle which is gripped when the applicator is being used, and which may be squeezed to increase the rate at which the fluid is dispensed by the roller. In this construction, the roller closes the sole orifice in the squeeze bottle. The roller may be removable so that the squeeze bottle may be refilled through the orifice. Alternatively, the bottle may be provided with an auxiliary filler opening, normally closed with a cap or the like. A flexible resilient seal may be employed between the squeeze bottle and the roller so that squeezing pressure on the bottle will substantially increase the thickness of the film of adhesive or other liquid carried outwardly and applied to the paper by the roller. Roller applicators of this construction are especially well adapted for use in applying rubber cement or other normally liquid adhesives. The applicator may be employed as the original container in which the cement is sold, because the applicator may be manufactured at such low cost that it may be treated as being expendable, and thus may be discarded after its original contents have been used up.

Further objects and advantages of the present invention will appear from the following description, taken with the accompanying drawings, in which:

FIG. 7 is a perspective view showing a sealing member employed in the applicator of FIG. 1.

FIG. 8 is a diagrammatic perspective view showing the manner in which the roller of the applicator lays down a rough coating of adhesive in a stripe-like pattern on a piece of paper or the like.

FIG. 9 is a perspective view showing a cake of waxy adhesive such as may be employed in the applicator of FIG. 1.

FIG. 10 is a greatly enlarged view showing the surface of the roller employed in the applicator of FIG. 1.

FIG. 11 is a greatly enlarged cross-sectional view, taken generally along the line 11—11 in FIG. 10.

FIG. 12 is an enlarged fragmentary section, similar to the lower portion of FIG. 4, but showing a modified construction.

FIG. 13 is a sectional view similar to FIG. 12, but showing an other modified construction.

FIG. 14 is an elevational view, partly in section, of a different illustrative embodiment of the present invention, in the form of a roller applicator having a receptacle or fountain which comprises a squeeze bottle.

FIGS. 15, 16 and 17, are fragmentary views, similar to the lower portion of FIG. 14, but showing various modified constructions.

FIGS. 18 and 19 are views similar to FIGS. 10 and 11, respectively, but showing a modification.

Figure 1:
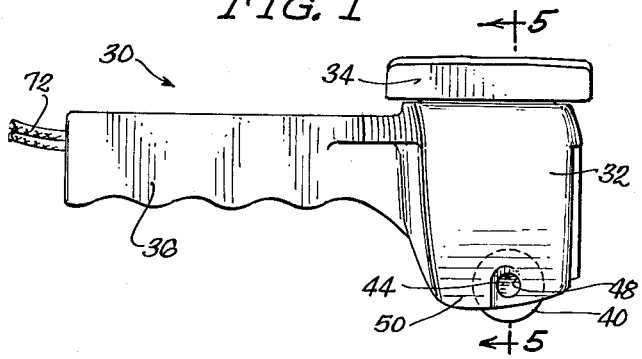
FIG. 1 is a side elevational view of a roller applicator to be described as a first illustrative embodiment of the present invention.
Figure 2:
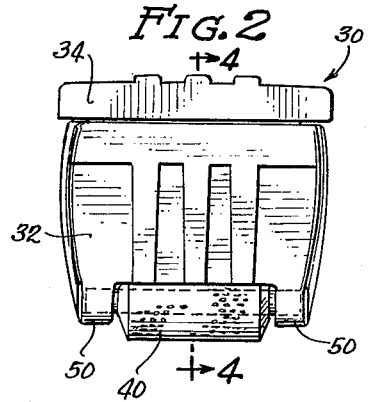
FIG. 2 is a front elevation view of the applicator of FIG. 1.
Figure 3:
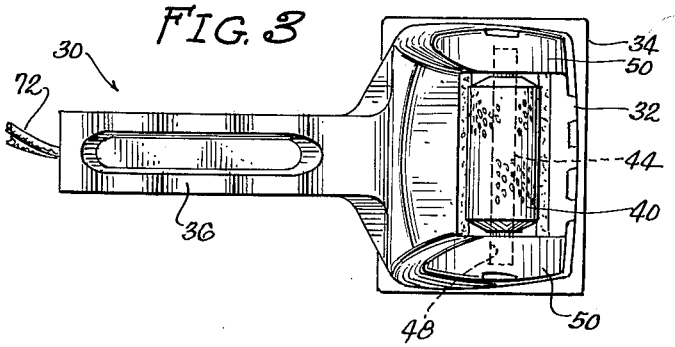
FIG. 3 is a bottom view of the applicator of FIG. 1.

It will be seen that FIGS. 1–12 illustrate a roller applicator 30 which will have many uses, but is particularly well adapted for applying a coat of adhesive to paper or other sheet material. The illustrated applicator 30 comprises a receptacle or trough 32 adapted to hold a supply of the adhesive or other liquid. It will be seen that the trough 32 is generally rectangular in shape and is provided with a closure or lid 34. A handle 36 extends from one side of the trough 32. Of course, the handle 36 is employed to hold the applicator 30 when it is being used. In addition, the handle 36 serves as a rest, adapted to engage a desk top or other supporting surface, so as to maintain the trough or fountain 32 in a generally upright position when it is not being used. The trough 32 and the handle 36 may be made of any suitable materials. It is preferred to mold these components in one piece from rubber, plastics or the like.

The bottom of the trough 32 is formed with an orifice or slot 38 which is closed by a rotatable roller 40. It will be seen that the roller 40 projects below the lowermost portion of the trough 32 so as to be engageable with a sheet of paper 42, or any other surface to which the adhesive is to be applied. The illustrated roller is cylindrical, but in some cases it might be spherical.

Suitable means are provided to support the roller 40 so that it will be free to rotate. In this case, the roller 40 is rotatable about a shaft 44 which extends through a bore 46. It will be seen that the bore 46 extends through the roller along its longitudinal axis. The ends of the shaft 44 are snugly received in bores 48 which are formed in lips or lugs 50 extending downwardly from the body of the trough 32. The lugs 50 may be formed integrally with the trough. While the shaft 44 normally remains in place during the use of the applicator, the shaft may be slipped out of the bores 46 and 48 so that the roller 40 may be removed from the applicator. Occasional removal of the roller may be desirable so that the orifice 38 may be cleaned.

Figure 4:
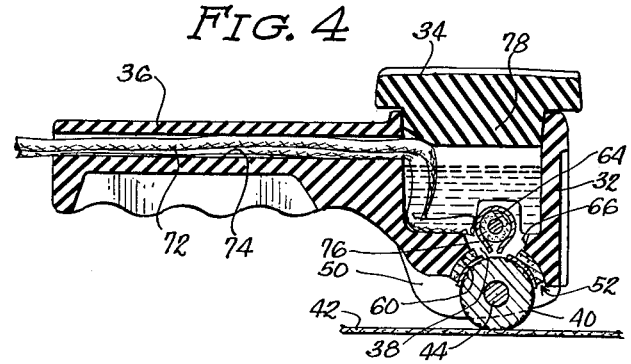
FIG. 4 is a longitudinal section, taken generally along a line 4—4 in FIG. 2.
Figure 5:
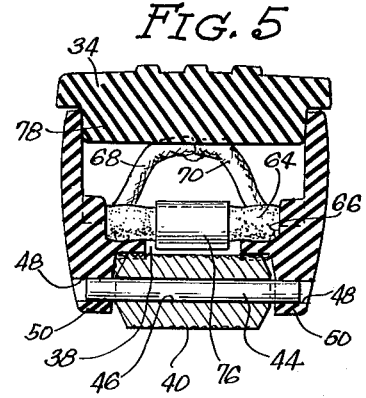
FIG. 5 is a cross section, taken generally along a line 5—5 in FIG. 1.
Figure 6:
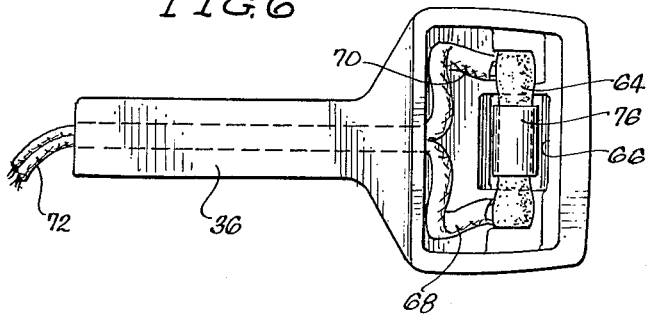
FIG. 6 is a top view of the applicator of FIG. 1, with the closure or cover removed for clarity of illustration.

Means are provided to form a seal between the roller 40 and the trough 32 so that the roller will prevent leakage of adhesive through the orifice 38. In this case, a sealing member 52 is provided between the roller 40 and the trough 32. FIG. 7 shows the sealing member 52 in its initial condition, before being installed in the applicator. Initially, the member 52 is generally in the form of a flat plate or block. When installed, the member 52 is cylindrically curved, as shown in FIG. 4. It will be seen that the sealing member 52 is formed with a slot 54 so that the adhesive will have access to the upper portion of the roller 40. As shown, the sealing member 52 comprises a relatively thick layer or ply 56 of soft resilient material, such as silicone rubber. The lower side of the rubber member 56 may be covered with a facing 58 of smooth flexible wear-resisting material, such as mylar, for example. However, the facing is often unnecessary and may be dispensed with. The upper side of the sealing member 52 is cemented or otherwise secured to the trough 32. It will be seen that the trough 32 is formed with a cylindrically curved surface 60 against which the sealing member 52 is mounted. The orifice 38 extends through the central portion of the cylindrically curved surface 60.

The applicator 30 is especially adapted to dispense an adhesive or other material which is normally in a solid state, at ordinary room temperatures. Various materials of this type may be employed. For example, the adhesive may be a waxy material which is adapted to be activated by either heat or pressure. Thus, the adhesive material may be both pressure sensitive and heat sensitive. The adhesive material may be supplied initially in the form of rectangular cakes or bars 62, as shown in FIG. 9. These cakes may be of such a size that one or more of them may be inserted into the trough 32.

Provision is made for melting the adhesive material and maintaining it in a liquid state. Thus, the illustrated applicator 30 is provided with a heating element 64 which may be electrically powered. As shown, the heating element 64 may take the form of a tubular or cylindrical resistor, adapted to be mounted in the lower portion of the trough 32. It will be seen that such lower portion is in the form of a recess or well 66, in which the heat from the resistor 64 is concentrated. Electrical power may be supplied to the resistor 64 by electrical leads 68 and 70 which are combined to form a two wire power cord 72. The power cord 72 may enter the trough 32 through a bore or opening 74 which extends longitudinally through the handle 36 and then through the rear wall of the trough.

In order to conduct heat from the resistor 64 downwardly into the lower portion of the well 66 and toward the roller 40, a heat conducting member 76 may be mounted on the resistor. As shown, the member 76 comprises a sheet metal member which is wrapped around the central portion of the resistor 64. The ends of the member 76 extend downwardly into close proximity to the upper portion of the roller 40. This insures that the roller 40 will be maintained in a heated condition. In this regard, it is preferred to form the roller 40 from aluminum or some other material which is highly heat conductive.

The closure 34 has a reduced lower portion 78 which fits snugly within the upper open end of the trough 32. In this way, the closure 34 prevents the melted adhesive from spilling out of the trough, in the event that the applicator should be accidentally tipped over. The closure 34 also retains heat in the trough 32. It is preferred to mold the closure 34 out of rubber or soft plastic material, but various other suitable materials may be employed.

While the roller 40 may have a smooth outer cylindrical surface, it is preferred to form the roller with a roughened surface so that it will apply a rough coat of adhesive. Such a rough coat is more easily activated by pressure than a smooth coat would be. The outer surface of the roller may be roughened by a conventional knurling operation, which will provide a large number of knobs on the surface of the roller. However, the drawings illustrate a preferred construction, in which the roller 40 is roughened by forming a large number of pits or depressions 80 in the cylindrical surface thereof. As shown, the pits 80 are of generally diamond shape, but they may be of various shapes. The illustrated pits 80 are distributed uniformly over the cylindrical surface of the roller 40.

In the construction shown in FIGS. 10 and 11, the roller 40 is formed with a pair of raised generally crescent-shaped projections or surfaces 82, adjacent each pit 80. The raised surfaces 82 are formed by the displacement or piling up of the metal when the pits 80 are pressed or rolled into the surface of the roller 40. The surfaces 82 are finished by a grinding or turning operation so that these surfaces are cylindrically curved. This finishing operation makes the outer surface of the roller quite smooth, so that it may rotate freely against the sealing member 52, without causing any substantial wear or damage to the sealing material. Between the raised surfaces 82, the roller 40 is formed with shallow grooves or interstices 84 which communicate with all of the pits 80, so that the adhesive will be free to flow over the surface of the roller 40 between the pits. This construction aids the distribution of the adhesive over the surface of the roller. Of course, pockets of adhesive will be retained in the pits 80 as the roller passes over the sealing member 52, and will be applied to the paper in the form of knobs or raised globules of adhesive.

FIGS. 18 and 19 illustrate a modified construction, in which the raised surfaces or projections 82 are omitted or are ground off, so that the roller 40a is formed with a smooth cylindrical surface 82a, between the diamond-shaped pits 80a. Any number of pits may be provided from one to a large number.

It may be helpful to summarize the operation of the applicator. As already noted, the applicator will find many uses, but is especially well adapted for applying a heat sensitive, pressure sensitive adhesive to paper or other sheet material. To prepare the applicator 30 for use, one or more cakes of the waxy adhesive are placed in the upper portion of the trough 32. The closure 34 is then placed on the trough 32. To melt the adhesive, the power cord 72 is connected to a power line, so as to heat up the resistor 64. After a few minutes, the heat of the resistor will melt the adhesive. The applicator will then be ready for use. It is preferred that the resistor be of low wattage, such as about 10 watts, so that the applicator may be kept hot all day long at very low cost. Thus, the applicator will always be ready for instant use.

The applicator 30 is used by rolling the roller 40 along the paper or other sheet material, so as to apply a stripe 86 of adhesive, as shown in FIG. 8. The paper may then be pressed against the surface on which it is to be mounted. A temporary bond may be formed by using light pressure. If greater pressure is employed, the bond will be adequately secure for all purposes. However, with the exercise of care, the paper sheet may be peeled away from the surface on which it is mounted. The sheet may then be remounted in a new location, if desired.

It will be evident that the present applicator is particularly well adapted for uses in which small sheets of paper or other sheet material are mounted on a larger mounting board or sheet. This type of work is frequently done in making advertising and printing layouts. Heretofore, rubber cement has generally been employed in making such layouts. The use of the present applicator has many advantages over the use of rubber cement. Thus, the present applicator makes it much easier to apply the adhesive to the paper sheets. Moreover, with the present applicator, the adhesive need be applied to only one of the two surfaces to be joined. There is no need to wait for the adhesive to dry. The photograph, art work or other small sheet may immediately be slid into place and pressed firmly against the supporting board or sheet. If an especially firm bond is desired, the small sheet may be rolled with a burnishing roller or rubbed with the edge of a ruler or other burnishing stick. This forms a bond which is adequately secure for virtually all purposes. Nevertheless, the sheet may be peeled away from its supporting surface, with the exercise of normal care. The sheet may then be adhered to the supporting surface in a new position, without any need to apply additional adhesive. Because the adhesive is solid at room temperatures, it may be stored indefinitely without drying out. Moreover, the cost of the adhesive is extremely low. Any excess adhesive may be removed from the paper sheets by rubbing off the adhesive with a rubber eraser. Of course, a suitable solvent may also be employed to remove excess adhesive.

FIG. 12 illustrates a modified construction, which is the same as that of FIGS. 1-11, except that the heat transfer member 76 is replaced by a fin 96 which projects downwardly from the heating element 64, into close proximity to the upper portion of the roller 40. The fin 96 projects downwardly through the slot 54 in the sealing member 52, and also through the orifice 38 in the bottom of the trough 32.

FIG. 13 illustrates another modified construction in which the heating element 64 is replaced with a heating element 98 which is disposed within the roller 40. In this case, the roller shaft 44 is replaced with a hollow shaft 100. The heating element 98 is disposed within the hollow shaft 100. In this way, the shaft 100 conducts the heat from the heating element 98 to the roller 40, which in turn conducts the heat to the adhesive or other material in the trough 32. Thus, the adhesive is melted so that it will be supplied in liquid form to the roller 40. With this arrangement, the roller 40 is kept sufficiently hot so that there will be no tendency for the adhesive to solidify on the exposed portion of the roller.

FIG. 14 illustrates a different roller applicator 102 constituting another illustrative embodiment of the present invention. It will be seen that the applicator 102 comprises a receptacle or fountain 104 which is in the form of a flexible resilient squeeze bottle. Thus, the bottle 104 may have relatively thin walls formed of a flexible resilient plastic material, such as polyethylene, polypropplene, or the like. The bottle 104 is entirely closed except for an orifice 106 at one end. This orifice 106 is closed by a roller 108 which may be the same or similar construction to the roller 40 of FIGS. 1-13. As shown, the roller is cylindrical, but it might be spherical. A shaft 110 extends through a bore 112 in the roller 108 and is mounted in lips or lugs 114 projecting downwardly from the bottle 104.

Adjacent its lower end, the bottle 104 is formed with a neck portion 116 which is provided with a curved surface 118 engaging the surface of the roller 108. The orifice 106 extends through the central portion of the curved surface 118. The roller 108 is in sealing engagement with the curved surface 118, so as to prevent leakage of any liquid between the roller and the curved surface. The resilient spring action of the neck portion 116 presses the curved surface 118 against the roller 108 so as to maintain a firm seal.

The bottle 104 is adapted to hold a supply of rubber cement or any other liquid which is to be dispensed. Originally, the bottle 104 is filled through the orifice 106 with the roller 108 removed, and with the bottle positioned so that the orifice 106 is directed upwardly. The roller 108 is then installed so as to serve as a closure for the bottle 104.

The rubber cement or other liquid may be dispensed by rolling the roller 108 along the surface of a piece of paper, or any other member to which the cement is to be applied. The quantity of cement to be dispensed may be controlled by squeezing on the bottle 104. This is easy to do, because the bottle 104 is employed as a handle for moving the applicator roller 108 over the surface of the paper. When the squeezing pressure on the bottle 104 is increased, the roller 108 applies a greater amount of cement to the paper. The increased pressure tends to flex the neck portion 116 of the bottle 104, so that the roller 108 will carry a greater amount of cement past the curved surface 118.

Of course, the bottle 104 may be refilled by removing the roller 108. However, the applicator 102 may be manufactured at such low cost that the applicator may be regarded as being expendable. Thus, the applicator may be discarded after the original contents of the bottle 104 are used up. To decrease the cost of the applicator 102, the roller 108 may be made of plastic. Even when plastic is used, the surface of the roller may be formed with pits, or may otherwise be roughened, as in the case of the roller 40 of FIGS. 1-13. Alternatively, a smooth-surfaced roller may be employed.

FIG. 15 illustrates a construction similar to that of FIG. 14, except that the neck portion 116 is replaced with a modified neck construction 142 comprising a flexible diaphragm wall 144 which is formed with corrugations or convolutions 146. The orifice 106 extends through the central portion of the flexible wall 144. On either side of the orifice 106, the flexible wall 144 has cylindrically curved sealing surfaces 148 which engage the cylindrical surface of the roller 108. The flexible spring action of the convolutions 146 presses the sealing surfaces 148 against the roller 108.

FIG. 16 illustrates a modified construction which is similar to the construction of FIG. 15, except that the neck portion 142 is replaced by a neck portion 152 which is longitudinally compressible. Thus, the neck 152 is provided with a longitudinal tubular member 154 which is formed with convolutions 156 zig-zagging along the length thereof. The lower end of the longitudinal member 154 has cylindrically curved surfaces 158 which engage the cylindrical surface of the roller 108. The resilient spring action of the convoluted member 154 presses the surfaces 158 against the roller 108 so as to maintain a firm seal.

FIG. 17 illustrates a modified construction which is similar to the construction of FIG. 14 except that the neck portion 116 is replaced with a modified neck portion 162, comprising a sealing member 164 which is pressed against the roller 108 by a resilient pad 166, which may be made of sponge rubber, sponge plastic or the like. In this way, a firm seal is maintained between the sealing member 164 and the roller 108.

While the applicators of FIGS. 14-17 may be formed with relatively rigid receptacles, it is preferred to form them with relatively flexible and resilient squeeze bottle receptacles, so that the amount of liquid dispensed by the roller may readily be increased by squeezing the bottle. The squeeze bottle cooperates with the flexible sealing means so as to reduce the sealing pressure between the sealing means and the roller when the bottle is squeezed. This permits the roller to carry a larger quantity of cement past the sealing means.

The roller may be smooth-surfaced, or may be formed with pits, or otherwise may be roughened, as in the case of the roller 14 of FIGS. 1-13. However, the roller may be made of plastic, and the pits may be molded in the cylindrical surface of the roller. Of course, if a more wear resistant roller is desired, it may be made of metal, as in the case of the roller for the heated roller applicator of FIGS. 1–13.

The applicators of the present invention are extremely easy to use. It is an easy matter to roll a stripe of adhesive or other fluid onto a piece of paper or the like. The adhesive or other fluid is dispensed evenly and without any unwanted excess. Thus, the applicators of the present invention produce neat results and are highly economical to use.

Various other modifications, alternative constructions and equivalents may be employed without departing from the true spirit and scope of the invention as exemplified in the foregoing description and defined in the following claims.

I claim:
1. An applicator,
  comprising a supply vessel for holding a supply of material,
  said supply vessel having a lower wall portion formed with an orifice,
  an applicator roller for applying the material,
  means rotatably mounting said roller on said vessel,
  a soft resilient compressible silicone rubber sealing pad mounted on said lower wall portion of said vessel,
  said pad having a smooth unbroken sealing surface engaging the periphery of said roller,
  said pad extending between said supply vessel and said roller and resiliently urging said sealing surface against said roller,
  said pad having an opening therein connecting with said orifice and extending between said vessel and said roller to conduct the material to said roller,
  an electric heater element mounted within said vessel and at least partly in said orifice and closely adjacent said roller for heating said material in said vessel while also heating said roller,
  and a generally horizontal handle member extending laterally from said vessel for holding said vessel in an upright position,
  said roller having a cylindrical surface with a plurality of pits therein for receiving the material,
  said roller having protruding portions projecting outwardly from said cylindrical surface around said pits for biting into any desired surface on which said roller may be rolled so as to prevent the roller from skidding on the surface.

2. An applicator,
  comprising a supply vessel for holding a supply of material,
  said supply vessel having a lower wall portion formed with an orifice,
  an applicator roller for applying the material,
  means rotatably mounting said roller on said vessel,
  a soft resilient compressible rubbery sealing pad mounted on said lower wall portion of said vessel,
  said pad having a smooth unbroken sealing surface engaging the periphery of said roller,
  said pad extending between said supply vessel and said roller and resiliently urging said sealing surface against said roller,
  said pad having an opening therein connecting with said orifice and extending between said vessel and said roller to conduct the material to said roller,
  and an electric heater element mounted within said vessel and at least partly in said orifice and closely adjacent said roller for heating said material in said vessel while also heating said roller,
  said roller having a cylindrical surface with a plurality of pits therein for receiving the material,
  said roller having protruding portions projecting outwardly from said cylindrical surface around said pits for biting into any desired surface on which said roller may be rolled so as to prevent the roller from skidding on the surface.

3. An applicator,
  comprising a supply vessel for holding a supply of fluid material,
  a roller for applying the fluid material,
  means rotatably supporting said roller on said vessel,
  a sealing member having a smooth unbroken surface engaging the periphery of said roller,
  said sealing member being made of soft resilient impervious material,
  and a resiliently yieldable member extending between said supply vessel and said sealing member and yieldably urging said sealing member against said roller,
  said sealing member and said resiliently yieldable member having an orifice therein extending between said vessel and said roller to conduct the fluid material to said roller,
  said resiliently yieldable member being made of a soft compressible rubbery material,
  said sealing member being made of resinous plastic material.

4. In an applicator, the combination comprising a vessel for holding a supply of fluid material, a cylindrical applicator roller for applying the fluid material, support means connected to said vessel and supporting said roller rotatably on an axis disposed in a fixed relationship to said vessel, non-absorbent sealing surface means having a concave cylindrical surface conforming in shape to the cylindrical periphery of said roller, said sealing surface means being in intimate and slidable contact with the periphery of said roller and having an area of contact with said roller, said sealing surface means having an orifice therein entirely surrounded by said area of contact to prevent leakage of the fluid material, an impervious elastic member extending from said vessel to said sealing surface means, said vessel having an opening therein, said member having a passage therein extending from said opening in said vessel to said orifice to conduct the fluid material from within the vessel to said roller, said member being imperviously connected to said vessel around said opening and to said sealing surface means around said orifice, said member being elastically stressed in biasing relation between said vessel and said sealing surface means to urge said sealing surface means against said roller, said member being constructed and arranged to maintain intimate contact between said sealing surface means and said roller throughout all of said area of contact when said roller is rotated and also when it is stationary.

5. In an applicator, the combination comprising a vessel for holding a supply of material, an electric heater element mounted in said vessel for maintaining the material in a fluid state, a cylindrical applicator roller for applying the fluid material, support means connected to said vessel and supporting said roller rotatably on an axis disposed in a fixed relationship to said vessel, non-absorbent sealing surface means having a concave cylindrical surface conforming in shape to the cylindrical periphery of said roller, said sealing surface means being in intimate and slidable contact with the periphery of said roller and having an area of contact with said roller, said sealing surface means having an orifice therein entirely surrounded by said area of contact to prevent leakage of the fluid material, an impervious elastic member extending from said vessel to said sealing surface means, said vessel having an opening therein, said member having a passage therein extending from said opening in said vessel to said orifice to conduct the fluid material from within the vessel to said roller, said member being imperviously connected to said vessel around said opening and to said sealing surface means around said orifice, said member being elastically stressed in biasing relation between said vessel and said sealing surface means to urge said sealing surface means against said roller, said member being constructed and arranged to maintain intimate contact between said sealing surface means and said roller throughout all of said area of contact when said roller is rotated and also when it is stationary.

6. The combination of claim 4, in which said sealing surface means consists of flexible sheet material.

7. The combination of claim 4, in which said vessel has flexible resilient wall means adapted to be squeezed for developing pressure on the fluid material in said vessel.

8. The combination of claim 4, in which said impervious elastic member is formed with convolutions to give it enhanced elastic yieldability.

9. The combination of claim 4, in which said roller has a plurality of pits in its cylindrical surface.

10. The combination of claim 4, in which said cylindrical applicator roller has a rough cylindrical surface for laying down a rough coat of the fluid material.

11. In a roller applicator, the combination comprising a receptacle for holding a supply of fluid material, a cylindrical roller rotatably mounted on said receptacle, said receptacle having a slot therein for carrying the fluid material to said roller, said receptacle having edge portions extending entirely around said slot and conforming generally in curvature to the cylindrical surface of said roller, and a soft resilient non-absorbent sealing gasket conforming in curvature to said cylindrical surface of said roller and snugly interposed between said edge portions of said receptacle and said cylindrical surface of said roller for preventing leakage of the fluid material between said receptacle and said roller, said gasket having a slot therein communicating with said slot in said receptacle and exposing a portion of the cylindrical surface of said roller to the fluid material in said receptacle, said roller having a plurality of pits in the cylindrical surface of said roller for carrying pockets of the fluid material past said gasket for application by said roller when the roller is rolled along the surface to which the fluid material is to be applied.

12. In an applicator, the combination comprising a vessel for holding a supply of fluid material, a cylindrical applicator roller for applying the fluid material, means connected to said vessel and rotatably supporting said roller for rotation about an axis positioned in a fixed relationship to said vessel, impervious sealing surface means having a concave cylindrical curvature conforming in shape to the cylindrical periphery of said roller, said sealing surface means having an orifice therein and an area of contact with said roller extending entirely around said orifice to prevent leakage of the fluid material, said vessel having an elastically yieldable wall portion of impervious material, said wall portion having an outlet therein connected to said orifice, said elastically yieldable wall portion being imperviously connected to said sealing surface means around said orifice, said elastically yieldable wall portion being resiliently strained between said vessel and said sealing surface means to urge said sealing surface means against said roller, said elastically yieldable wall portion being proportioned and positioned to continuously press and maintain said sealing surface means in intimate engagement with said roller throughout said area of contact when said roller is stationary and also when it is rotated.

References Cited in the file of this patent
UNITED STATES PATENTS

| | | |
|---|---|---|
| 495,604 | Sorg | Apr. 18, 1893 |
| 659,109 | Smith | Oct. 2, 1900 |
| 1,476,015 | Julian | Dec. 4, 1923 |
| 1,849,938 | Lewis | Mar. 15, 1932 |
| 1,899,770 | Oppenheimer | Feb. 28, 1933 |
| 2,081,673 | Olson | May 25, 1937 |
| 2,151,344 | Barnard | Mar. 31, 1939 |
| 2,471,397 | Perri | May 24, 1949 |
| 2,706,474 | Ackerman | Apr. 19, 1955 |
| 2,732,575 | Faust | Jan. 31, 1956 |
| 2,762,072 | Madalinski | Sept. 11, 1956 |
| 2,787,244 | Hickin | Apr. 2, 1957 |
| 2,940,105 | Woellworth | June 14, 1960 |
| 3,030,926 | Sattmann | Apr. 24, 1962 |

FOREIGN PATENTS

| | | |
|---|---|---|
| 405,901 | Great Britain | Feb. 15, 1934 |
| 1,063,724 | France | Dec. 16, 1953 |
| 1,078,165 | France | May 5, 1954 |